(12) United States Patent
Schwaar et al.

(10) Patent No.: US 6,430,476 B1
(45) Date of Patent: Aug. 6, 2002

(54) METHOD AND DEVICE FOR CONTROLLING THE MOVEMENT OF A SUPPORT

(75) Inventors: Michael Schwaar, Hartmannsdorf; Zenon Karczewski, Dresden; Hans-Joachim Koriath, Jena, all of (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/262,279

(22) Filed: Mar. 4, 1999

Related U.S. Application Data

(63) Continuation of application No. PCT/EP97/03127, filed on Jun. 16, 1997.

(30) Foreign Application Priority Data

Sep. 5, 1996 (DE) .......................................... 196 36 102

(51) Int. Cl.[7] .............................................. G05B 19/04
(52) U.S. Cl. ....................... 700/251; 700/114
(58) Field of Search ............................ 700/89, 29, 260, 700/261, 251, 252, 256, 194, 117; 318/568.17; 901/41, 23; 409/132

(56) References Cited

U.S. PATENT DOCUMENTS

| | | | |
|---|---|---|---|
| 4,408,286 A | * 10/1983 | Kikuchi et al. | ............. 700/260 |
| 4,580,229 A | 4/1986 | Koyama et al. | ............. 700/260 |
| 5,179,525 A | 1/1993 | Griffis et al. | |
| 5,401,128 A | 3/1995 | Lindem et al. | |
| 5,459,659 A | * 10/1995 | Takenaka | ..................... 700/262 |
| 5,556,242 A | 9/1996 | Sheldon et al. | ............. 409/132 |
| 5,732,195 A | * 3/1998 | Nakata et al. | ......... 318/568.17 |

FOREIGN PATENT DOCUMENTS

| | | |
|---|---|---|
| DE | 42 12 537 A1 | 10/1992 |
| DE | 195 22 963 A1 | 12/1995 |
| EP | 0 120 198 A1 | 10/1984 |
| EP | 0 308 539 A1 | 3/1989 |
| EP | 0 573 962 A2 | 12/1993 |
| JP | 07-273273 A4 | 10/1995 |

OTHER PUBLICATIONS

William K. Durfee, et al., "Real–Time Control of the MIT Vehicle Emulation System", Proceedings of the American Control Conference, Boston, Jun. 26–28, 1991, vol. 2, Jun. 26, 1991, Institute Of Electrical And Electronics Engineers, pp. 2057–2058.

P. Rojek, et al., "Schnelle Koordinatentransformation und Führungsgrössenerzeugung für bahngeführte Industrieroboter", Robotersysteme, vol. 2, No. 2, 1986., pp. 73–81.

Masory, O. et al., "On the Accuracy of a Stewart Platform–Part II–Kinematic Calibration and Compensation", Proceedings of the IEEE International conference on robotics and Automation, May. 2–6, 1993, vol. 1. pp. 725–731.

* cited by examiner

*Primary Examiner*—Leo Picard
*Assistant Examiner*—Kidest Bahta
(74) *Attorney, Agent, or Firm*—Akin, Gump, Strauss, Hauer & Feld, L.L.P.

(57) ABSTRACT

A method is provided for controlling the movement of a support relative to a base by movement devices whose degrees of freedom of movement define a non-orthogonal coordinate system. For achieving a dynamic behavior corresponding to that of a machine with orthogonal directions of movement, non-orthogonal actual-condition values of the movement devices are detected, transformed into orthogonal coordinates, and, on the basis of the transformed actual-condition values and the predetermined target-condition values, operating values in orthogonal coordinates are determined, which are then transformed into non-orthogonal coordinates and transmitted to the individual movement devices. In addition, a device for controlling the movement of the support is provided, as well as a machine tool with a hexapodal suspension of the support, which has provided thereon a machining device.

12 Claims, 4 Drawing Sheets

METHOD AND DEVICE FOR CONTROLLING THE MOVEMENT OF A SUPPORT

CROSS REFERENCE TO RELATED APPLICATION

This application is a continuation of International Application PCT/EP97/03127, filed Jun. 16, 1997, the disclosure of which is incorporated herein by reference.

BACKGROUND OF THE INVENTION

The present invention relates to a method of controlling the movement of a support relative to a base, comprising a central control unit for generating target-condition values in the coordinates of an orthogonal coordinate system of said base for moving the support and further comprising movement devices for moving the support, the degrees of freedom of the movement devices defining a non-orthogonal coordinate system. In addition, the present invention relates to a device for controlling the movement of a support relative to a base as well as a machine tool provided with a machining device.

Such methods and devices are particularly suitable for machine tools with non-orthogonal axes of movement, the workpiece being secured in position on the base and a machining device being provided on the support. The relative movements required for producing the workpiece are normally carried out by moving the support relative to the stationary base, but it is also possible to carry out a feed motion with the base in one or in all directions of movement. Such devices and methods are advantageously used for machine tools having non-orthogonal feed axes and a closed-loop kinematic structural design. These devices and methods are particularly suitable for use in hexapodal machining centers in which the support is articulated on the base via six struts of adjustable length. The movement of the support in all spatial degrees of freedom is effected by a controlled adjustment of the length of the struts, a nonorthogonal coordinate system being defined by the changes in length along the six linear axes. In addition, such devices and methods are suitable for use with manipulation devices for positioning and transporting workpieces. The longitudinally adjustable struts can also be replaced by struts having a fixed length; in this case, e.g., the foot points of said struts are displaced. Also, a combination with axes of rotation is possible.

In the case of movement devices, the movements to be carried out are normally related to a fixed orthogonal coordinate system corresponding to the degrees of freedom of movement of the individual movement devices. For producing a work-piece in a machine tool, this coordinate system is zeroed to a reference point of the workpiece before the machining operation begins. This permits a simple programming of the movement to be carried out and a comparatively small computing effort when the program is being executed in the machine.

In the course of more recent developments in the field of machine tools, machines with non-orthogonal feed axes have lately been suggested; in comparison with conventional machine tools with orthogonal feed axes, these machine tools are characterized by a substantially improved rigidity of the machine structure and by a comparatively high degree of local independence of their stability behavior. For carrying out, e.g., a straight movement by such machines, several or all movement devices must normally operate synchronously and at an interpolated speed. The degrees of freedom of movement of the movement devices necessitate a nonorthogonal coordinate system. Hence, a programmer is unable to realize the feed motions of the individual movement devices which are required for a movement of the support that is to be carried out relative to a stationary orthogonal coordinate system. Programming in the degrees of freedom of movement of the individual movement devices is extremely difficult.

In the case of such numerically controlled machine tools, it has therefore already been suggested that the position of a point of aim in coordinates of a fixed orthogonal coordinate system (X, Y, Z, A, B, C) should be transformed into a nonorthogonal coordinate system ($L_1$, $L_2$, $L_3$, $L_4$, $L_5$, $L_6$), while the program is being executed. German published patent application DE 195 22 963, for example, discloses a control for a hexapodal machine tool in the case of which a feed motion is subdivided into individual steps; calculating the starting and end points of each step, the necessary changes of length and rates of changes of the individual struts of a hexapodal suspension are determined on the basis of a starting point and a point of aim and on the basis of a predetermined step time. Detection of the actual condition is not carried out in this case.

In addition, it is known that such an interpolation cycle is followed by position control so that the control takes place in the coordinates of the strut lengths ($L_1$, $L_2$, $L_3$, $L_4$, $L_5$, $L_6$), since this would permit the operating values determined in the interpolation calculation to be transmitted to the struts in a comparatively simple manner.

Since the coordinate system of the strut lengths $L_1$ is not orthogonal, each of the strut lengths $L_1$ is normally a function of one or more coordinates of the orthogonal system (X, Y, Z, A, B, C). If the control takes place in the coordinates of the strut lengths, the individual control circuits will be coupled to one another. In view of non-linear interactions, the dynamic behavior of a machine tool controlled in this way is position- and direction-dependent. In particular, it is then not possible to adjust the dynamic properties with regard to the directions of the orthogonal system separately for each direction by means of suitable parametrization of the control circuits. Since the control paths associated with each individual controller in the coupled system have a higher order, the maximum adjustable loop gain is smaller than that of decoupled control circuits. If, however, the transformation of the coordinates took place before the interpolation, the effects of non-linear interpolation methods could no longer be mastered.

A control method and a control device of the type set forth at the outset are known from P. Rojek et al., "Schnelle Koordinatentransformation und Führungsgrössenerzeugung für bahngeführte Industrieroboter" *Robotersysteme*, 2:2, pp. 73–81, Springer Verlag (1986). The control is here, however, performed in the non-orthogonal region. Decoupling of the control in the individual orthogonal coordinate axes is not possible. In addition, European published patent application EP 0 120 198 discloses a control device for an industrial robot in the case of which movement control is performed partly in orthogonal coordinates and partly in non-orthogonal coordinates.

SUMMARY OF THE INVENTION

It is an object of the present invention to provide a method and a device for controlling the movement of a support and of a machine tool, respectively, by means of which a dynamic behavior of a support with non-orthogonal feed axes is achieved which corresponds to that of a support with orthogonal axes of movement.

For solving the above-mentioned object, a method for controlling the movement of a support relative to a base is provided, wherein the target-condition values of the movement of the support are predetermined in coordinates of an orthogonal coordinate system of the base, the actual-condition values of the support are detected in the coordinates of a non-orthogonal coordinate system, which is defined by the degrees of freedom of the movement devices for moving the support, and transformed into the orthogonal coordinate system. A control for determining operating values for the movement of the support is performed on the basis of the target-condition and actual-condition values, said control being carried out in the orthogonal coordinates of the base, and the operating values are subsequently transformed into coordinates of the non-orthogonal coordinate system.

In addition, this object is achieved in the case of the above-mentioned device by the features that a computing unit is connected between the central control unit and the movement devices, said computing unit comprising a transformation module for transforming actual-condition values of the support from non-orthogonal coordinates into orthogonal coordinates, a controller for determining operating values in orthogonal coordinates from the actual-condition and target-condition values, and a further transformation module for transforming the determined operating values into the coordinates of the non-orthogonal coordinate system.

A separation of the control circuits of the orthogonal coordinate system is achieved in this way, so that the dynamic properties with regard to the axes of the orthogonal coordinate system can be adjusted independently of one another. This permits an optimization of the loop gain. In addition, the position- and direction-dependence of the dynamic properties is eliminated conceptually. The possibilities which exist in numeric control systems and which permit a compensation of the inertia in the individual controlled axes can only be utilized if the dynamic behavior of the axes is not position-dependent. This is achieved by the present invention. Hence, determined dynamic properties are created in the orthogonal axes, which now permit the use of compensation algorithms in devices with non-orthogonal axes of movement.

Preferably, a separate control unit is provided for each coordinate means of the orthogonal system so that the dynamic properties can be determined by parametrizing the individual control circuits separately from one another.

Preferably, a drive-bus controller is provided in addition to the device for generating the target-condition values, said drive-bus controller being used for controlling the individual movement devices. This drive-bus controller is connected to the central control unit via a computer bus. Due to the additional connection of the computing unit, which includes the controller and the transformation modules, it is possible that, on the basis of comparatively small modifications, an existing numeric control for a machine with orthogonal movement devices can be used for a machine with a non-orthogonal movement device so that the whole function of the control device can be continued to be used without any limitations. An operator who is familiar with known NC machine tools can thus use the machine with non-orthogonal movement devices in the manner which is already known to him. In addition, it is not necessary to adapt already existing NC programs so as to produce desired sequences of movements, such as a machining program for a machine tool or a program for positioning a workpiece.

When a digital drive bus to the movement devices is used, said drive bus is preferably implemented as a ring bus, a separate interface being provided on the computing unit for each arm of said ring bus. The bus is used for transferring the actual-condition values of the individual movement devices to the computing unit and for transferring the operating values to the movement devices.

The machine tool, which is suggested as well, achieves the same advantages as the above-mentioned device.

The device according to the present invention and the method according to the present invention can, fundamentally, be used in the case of devices having non-orthogonal axes of movement and a closed-loop kinematic structural design. Such use preferably takes place in the case of machines with a hexapodal suspension of the support on the base, the non-orthogonal coordinate system of the support being defined by the axial lengths of six struts of adjustable length. It is also possible to use, e.g., struts of fixed length whose foot points are moved in a translatory or rotatory manner.

For increasing the control accuracy in the case of digital control, also speed and force/moment values can be taken into account in addition to position values. Preferably, the movement devices are controlled via operating values corresponding to the moments of the individual movement devices required for the movement. This can be done, e.g., by adjusting the current of a motor. In principle, it is, however, also possible to use other movement devices, such as hydraulic or pneumatic cylinders. Also, the use of servomotors is possible. The operating values must then be adapted accordingly.

Other advantageous further developments of the present invention are described below and set forth in the dependent claims.

BRIEF DESCRIPTION OF THE SEVERAL VIEW OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
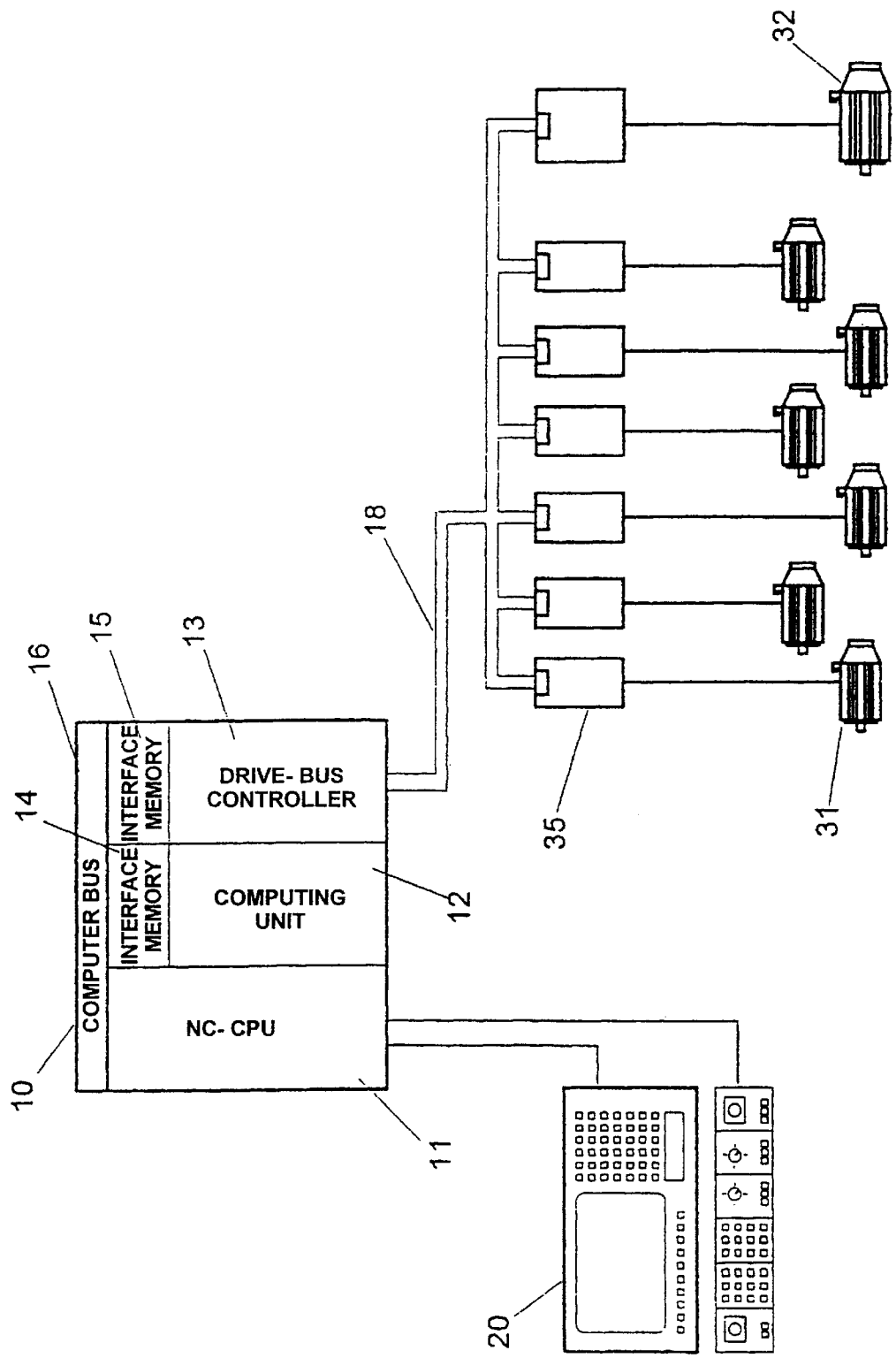
FIG. 1 shows a control device of a first embodiment used in a machine tool.
Figure 2:
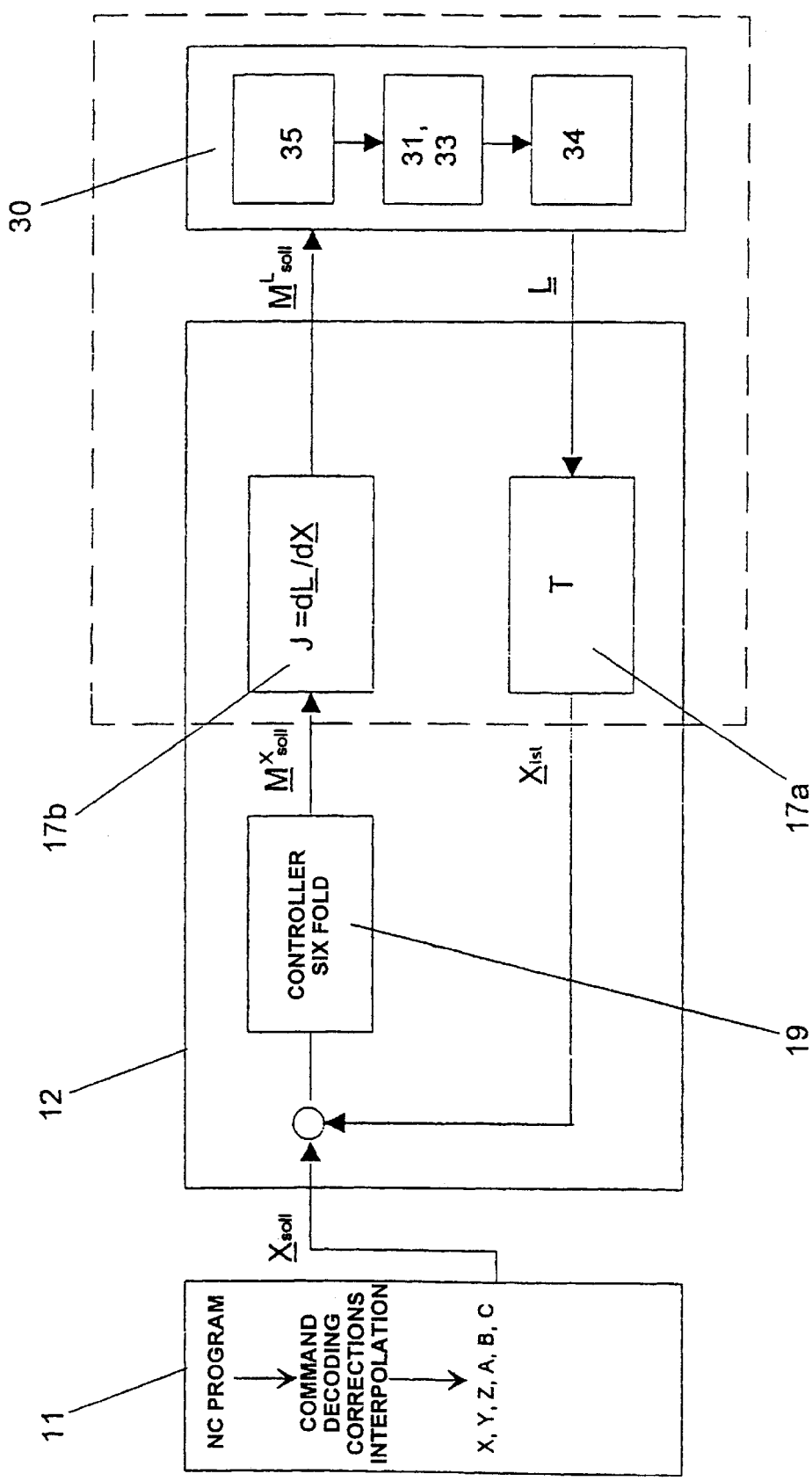
FIG. 2 shows the position control in the control unit.
Figure 3:
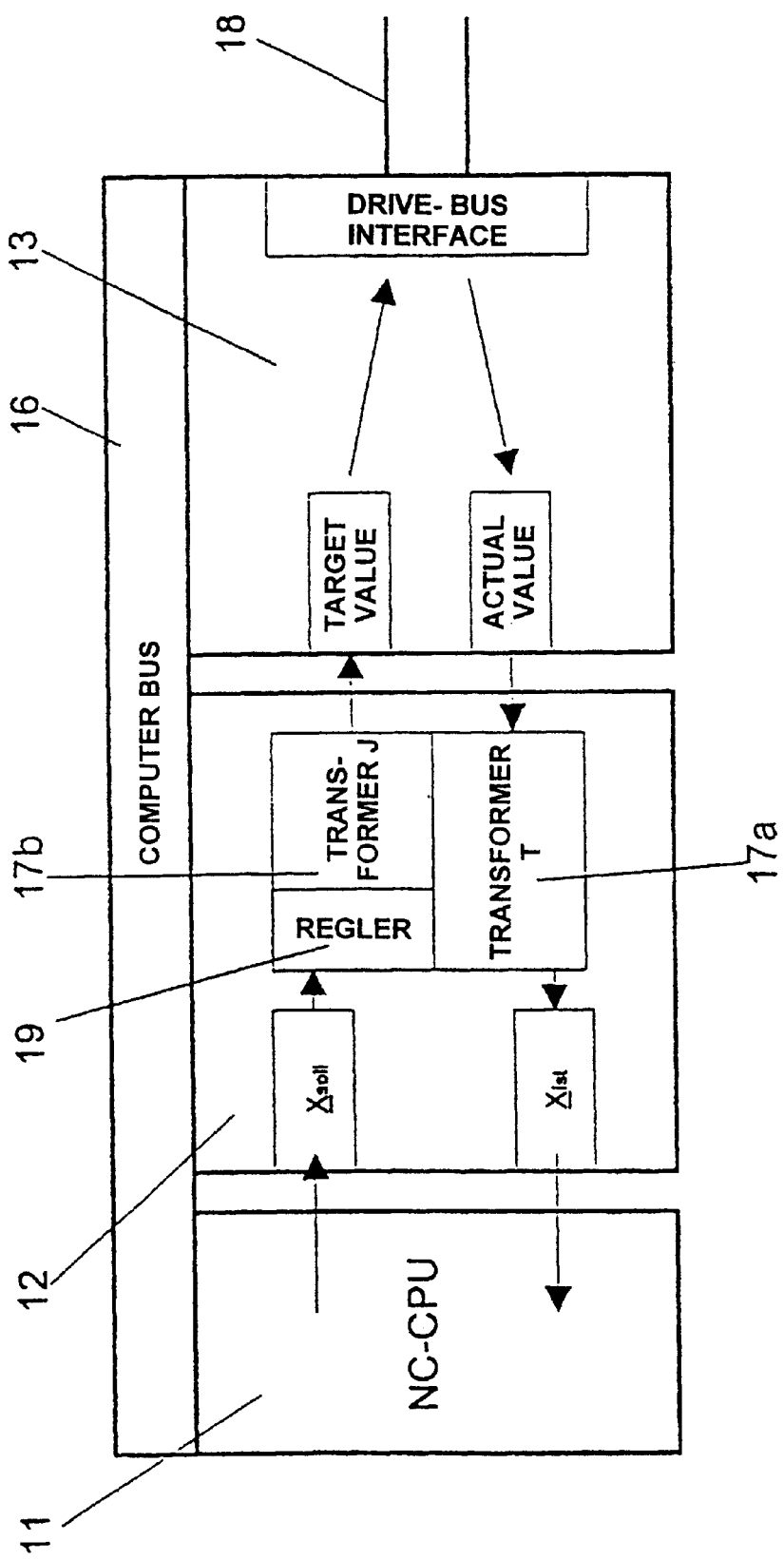
FIG. 3 shows the internal structure of the control unit.

A first embodiment is described on the basis of FIGS. 1 to 3. In this embodiment the device 10 is used for moving a support in a hexapodal machine tool in which said support is articulated on a base via six struts of adjustable length. FIG. 1 shows, however, only the movement devices for adjusting the length of the individual struts, said movement devices being here implemented as electric motors 31 provided with operating devices 35. The support has provided thereon a machining device whose main spindle is driven by a further motor 32. For controlling the sequence of movements of the support, an operating unit 20 is additionally provided, which is coupled to the device 10. This operating unit can be used for inputting a control routine on the one hand and for influencing the sequence of movements when the machine is in operation on the other.

The device 10 for controlling the movement of the support is provided with a device for generating target-condition values for moving the support. This device 11 is implemented as an NC processor which stores a control routine inputted via the operating unit 20, processes said control routine and executes the division of individual operating steps, including the necessary interpolations in the coordinate directions, said division being necessary for the movement in the various coordinate directions. The control routine is inputted as well as processed in the coordinates of an orthogonal coordinate system X, Y, Z, A, B, C which is related to a reference point on the workpiece to be machined. Also possibly required corrections of the sequence of movements are here carried out for taking into account, e.g., different lengths and shapes of the tool.

The control device 10 is connected via a drive bus 18 to the individual movement devices, i.e., the operating devices 35 and the motors 31, so as to transmit data between both sides in both directions. The drive bus 18 is controlled by a drive-bus controller 13 which is provided in the control device 10. In addition, the control device 10 is provided with a computing unit 12 connected between the NC processor 11 and the drive-bus controller 13. A computer bus is provided for transmitting data between the NC processor 11, the drive-bus controller 13 and the computing unit 12. This arrangement permits a conventional NC control comprising an NC processor 11 and a drive-bus controller 13 to be divided and to be supplemented by the additional computing unit 12, so that the program structure in the NC processor 11 must, if at all, only be modified slightly.

The computing unit 12 has supplied thereto via the computer bus 16 target-condition values of the movement of the support from the NC processor 11 and actual-condition values of the movement of the support from the drive-bus controller 13, said computing unit 12 generating, in turn, operating values. These operating values will be supplied to the individual movement devices via the computer bus 16 and the drive-bus controller 13, controlled via the drive bus 18.

The data and signals, respectively, transmitted between the NC processor 11 and the computing unit 12 are related to the orthogonal coordinate system X, Y, Z, A, B, C of the control routine, i.e., to workpiece coordinates, whereas the data and signals, respectively, exchanged between the computing unit 12 and the movement devices are related to the non-orthogonal coordinate system $L_1, L_2, L_3, L_4, L_5, L_6$ ($L_i$) of the struts of the hexapodal suspension. For temporary storage, the computing unit 12 and the drive-bus controller 13 are each provided with an interface memory 14, 15 in which the data and signals to be transmitted are stored temporarily.

The computing unit is provided with a controller 19 for controlling the movement of the support and with a transformation module 17a for transforming actual-condition values of the support, which are detected by a position measurement system 34, into orthogonal coordinates. A further transformation module 17b for transforming operating values produced by the controller 19 into coordinates of the non-orthogonal coordinate system is also arranged in the computing unit 12. The controller 19 is implemented as a six-fold controller, a separate control unit being provided for each coordinate of the orthogonal coordinate system X, Y, Z, A, B, C.

On the basis of FIGS. 2 and 3, the mode of operation of the first embodiment will now be described. A control routine for controlling the movement of the working platform and other values of a machining operation is inputted via the operating unit 20 in the usual way and filed in the NC processor. Possibly necessary corrections and interpolations in the orthogonal coordinates are carried out in the NC processor 11. The support, i.e., in this case the individual motors 31, are controlled from the NC processor 11. While the movement program is being executed, target-condition values $X_{soll}$ are constantly generated, said target-condition values being clockwise transmitted to the computing unit 12 via the computer bus 16. In so doing, the individual values are filed temporarily in the interface memory 14 of the computing unit 12.

While the program is being executed, the movement of the individual struts 33 of the hexapodal suspension, which are shown only schematically in FIG. 2, is detected by position measurement means 34, which are also shown only schematically, and transmitted via the drive bus 18 to the drive-bus controller 13 and from said drive-bus controller 13 via the computer bus 16 to the computing unit 12. The actual-condition values may be stored temporarily in the interface memory 15 of the drive-bus controller 13. The detection of the actual-condition values is carried out in the non-orthogonal coordinates $L_i$ of the degrees of freedom of movement of the movement devices, i.e., the changes in the axial length of the individual struts 33. Alternatively, it would also be possible to use struts of fixed length whose foot points are moved in a translatory and/or rotatory manner. The actual-condition values can also be filed in the interface memory 14 of the computing unit 12.

The actual-condition values supplied in the non-orthogonal coordinates $L_i$ are transformed in the computing unit in the transformation module 17a into the coordinates of the orthogonal coordinate system. Subsequently, the thus transformed actual-condition values are compared with the target-condition values and the differential value is applied to the input side of the controller 19. In the controller 19 moment-proportional operating values are produced in the orthogonal coordinates X, Y, Z, A, B, C. Subsequently, these operating values are transformed in the transformation module 17b into the non-orthogonal coordinate system $L_1, L_2, L_3, L_4, L_5, L_6$ and, if necessary, filed in the interface memory 14; from said interface memory 14 they are then supplied to the individual movement devices via the computer bus 16 via the drive-bus controller 13 and the drive bus 18. The operating values can again be filed temporarily in the interface memory 15 of the drive-bus controller 13.

Due to the arrangement of the controller 19 on the side of the orthogonal coordinates, parametrization can be carried out separately in each individual orthogonal coordinate. It is also possible to use a separate controller for each coordinate. The operating values need not necessarily be generated moment-proportionally. Rather, the drive control circuits can also be operated as rotational speed or position control circuits, the superimposed position and rotational speed control being approximately compensated in the computing unit 12. In addition to position values, also speed and force/moment values can be predetermined and detected, respectively, as condition values.

The rotational-speed target value for the main drive of a machining device on the support, e.g., a spindle, can be written without any changes from the NC processor 11 via the computer bus 16 directly into the interface memory 15 of the drive-bus controller 13 from which control of the main drive, in this case the motor 32, is effected.

Figure 4:
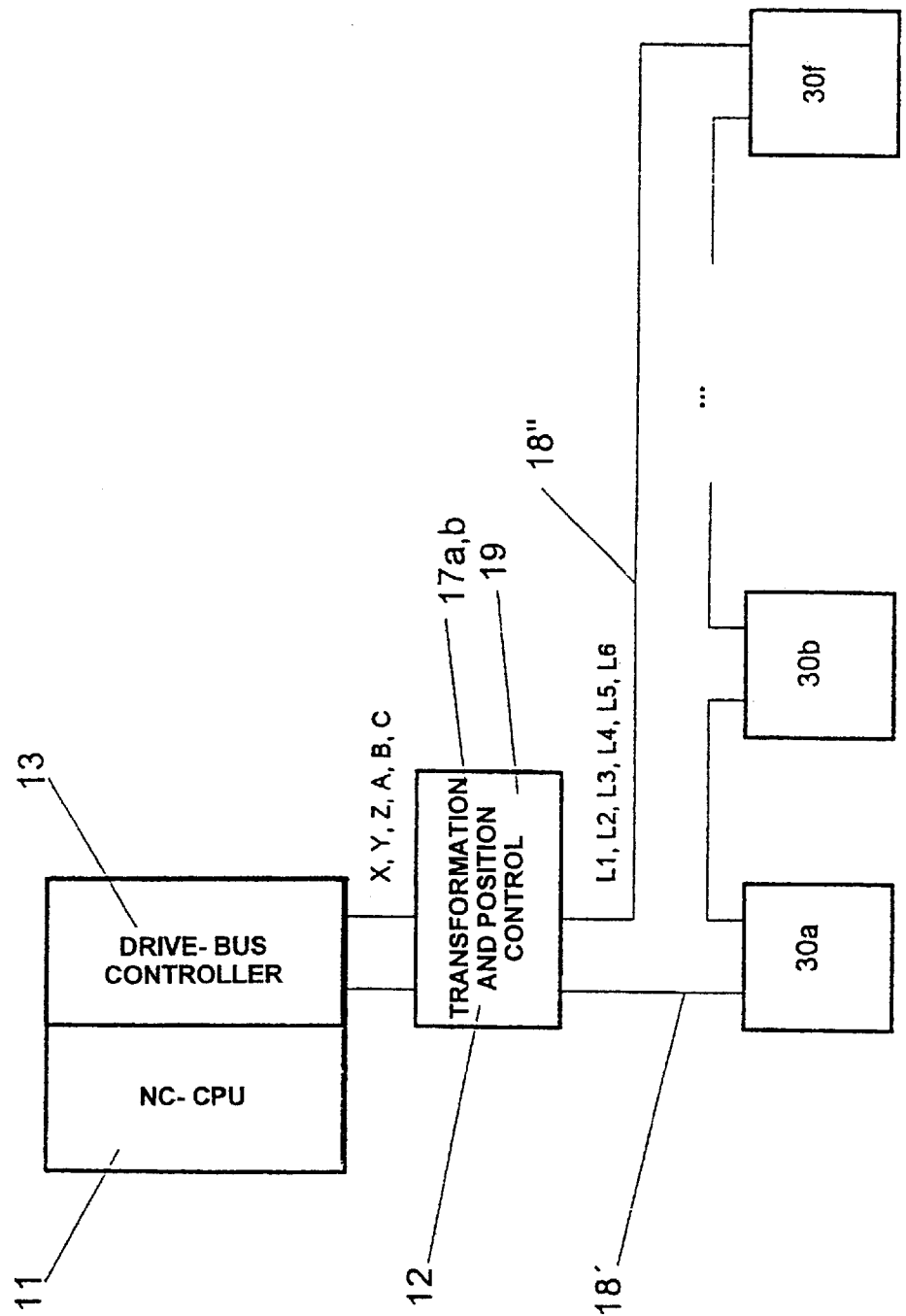
FIG. 4 shows a control device of a second embodiment.

A second embodiment is shown in FIG. 4. In contrast to the first embodiment, the drive-bus controller 13 is here connected between the NC processor 11 and the computing unit 12. This arrangement is particularly suitable when a digital drive bus in the form of a ring is used. This drive bus has two arms 18', 18" which are each connected to an interface of the computing unit 12. The ring bus serves to transmit to the computing unit 12 the actual-condition values of the movement devices 30a, 30b, 30c, 30d, 30e, 30f, which are detected by the measurement means. In addition, it transmits the operating values and signals, respectively, from the computing unit 12 to the individual movement devices which are implemented as motors 31 provided with operating devices 35 and a measurement system 34 as in the case of the first example. On the ring bus, the data are advanced from one operating device 35 to the next.

Each adjustment device extracts its target value and feeds in its actual value. In principle it is, however, also possible to use servomotors for adjusting the lengths of the individual struts 33; in this case, the controller 19 will have to be adapted in a suitable manner. A length adjustment via hydraulic or pneumatic cylinders is possible as well. Also the second embodiment permits a conventional NC control for a machine with orthogonal movement devices to be used, without great effort, for a machine with non-orthogonal movement devices. Both embodiments are not limited to hexapodal devices, but can be used in the case of all types of movement devices having a closed-loop kinematic structural design with non-orthogonal directions of movement.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A method of controlling the movement of a support relative to a base by movement devices whose degrees of freedom of movement define a non-orthogonal coordinate system, in particular for a machine tool provided with a machining device on the support and a workpiece reception means on the base, comprising predetermining target-condition values of the movement of the support in coordinates of an orthogonal coordinate system (X, Y, Z, A, B, C) of the base, detecting actual-condition values of the support in the coordinates of the non-orthogonal coordinate system ($L_1, L_2, L_3, L_4, L_5, L_6$), transforming the actual-condition values into the orthogonal coordinate system (X, Y, Z, A, B, C), performing a control for determining operating values in orthogonal coordinates for the movement of the support on the basis of the target-condition and actual-condition values, carrying out the control in the orthogonal coordinates (X, Y, Z, A, B, C) of the base, and subsequently transforming the operating values into coordinates of the non-orthogonal coordinate system ($L_1, L_2, L_3, L_4, L_5, L_6$).

2. The method according to claim 1, wherein a common computer bus (16) is used for writing the actual-condition and target-condition values as well as the operating values into addresses of a computing unit (12) in which the operating values are determined and for reading them from said addresses.

3. The method according to claim 1, comprising writing the detected actual-condition values into an interface memory (15) of a drive-bus controller (13) controlling the movement devices of the support, and transmitting the actual-condition values from the interface memory (15) into an interface memory (14) of the computing unit (12).

4. The method according to claim 3, wherein operating values are determined on the basis of the actual-condition values filed in addresses of the interface memory (14) of the computing unit (12), said operating values being written into further addresses of the interface memory (14), and transmitting the operating values from said further addresses to the interface memory (15) of the drive-bus controller (13) for controlling the movement devices.

5. The method according to claim 1, wherein the control of the movement devices (31) from the computing unit (12) and the transmission of actual-condition values from the movement devices (31, 35) and from the support, respectively, to the computing unit (12) takes place via a ring bus (18', 18").

6. The method according to claim 1, wherein the control is carried out separately in each coordinate means of the orthogonal coordinate system (X, Y, Z, A, B, C).

7. The method according to claim 1, wherein the actual-condition and the target-condition values comprise position values and/or speed values and/or force/moment values.

8. The method according to claim 1, wherein the operating values are generated as moment-proportional values.

9. A device for controlling the movement of a support relative to a base, comprising a central control unit (11) for generating target-condition values of the support in the coordinates of an orthogonal coordinate system (X, Y, Z, A, B, C) of the base, movement devices for moving the support, the degrees of freedom of the movement defining a non-orthogonal coordinate system ($L_1, L_2, L_3, L_4, L_5, L_6$), and means for determining actual-condition values, wherein a computing unit (12) is connected between the central control unit (11) and the movement devices (31, 35), said computing unit (12) comprising a transformation module (17a) for transforming actual-condition values of the support from non-orthogonal coordinates into orthogonal actual coordinates, a separate controller (19) for determining operating values in orthogonal coordinates from the actual-condition and target-condition values in orthogonal coordinates, and a further transformation module (17b) for transforming the operating values from the orthogonal coordinate system into the non-orthogonal coordinate system.

10. The device according to claim 9, wherein the controller (19) comprises a separate control unit for each coordinate means of the orthogonal coordinate system.

11. The device according to claim 9, wherein a drive-bus controller (13) is provided for controlling the movement devices (31, 35), and the computing unit (12) is connected to a computer bus (16), which connects the central control unit (11) to the drive-bus controller (13), so as to control the transfer of the actual-condition values and operating values between the computing unit (12) and the movement devices (31, 35).

12. The device according to claim 9, wherein the computing unit (12) is provided with an interface memory (14) for storing actual-condition values in non-orthogonal coordinates, target-condition values in orthogonal coordinates and operating values in non-orthogonal coordinates.

* * * * *